(12) United States Patent  
Burger et al.

(10) Patent No.: US 9,106,691 B1  
(45) Date of Patent: Aug. 11, 2015

(54) SYSTEMS AND METHODS OF IDENTITY PROTECTION AND MANAGEMENT

(75) Inventors: Michael Burger, Aliso Viejo, CA (US); Mark Joseph Kapczynski, Santa Monica, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 808 days.

(21) Appl. No.: 13/234,637

(22) Filed: Sep. 16, 2011

(51) Int. Cl.
*H04L 29/06* (2006.01)
*H04L 29/08* (2006.01)

(52) U.S. Cl.
CPC ........ *H04L 63/1441* (2013.01); *H04L 63/1408* (2013.01); *H04L 63/1483* (2013.01); *H04L 67/025* (2013.01)

(58) Field of Classification Search
CPC . H04L 63/1441; H04L 63/1483; H04L 63/14; G06F 63/08; G06F 63/083; G06F 21/31; G06F 21/50
USPC .............................................................. 726/7
See application file for complete search history.

(56) References Cited

U.S. PATENT DOCUMENTS

| | | | |
|---|---|---|---|
| 5,659,731 A | | 8/1997 | Gustafson |
| 5,719,941 A | * | 2/1998 | Swift et al. ............... 713/155 |
| 5,754,632 A | | 5/1998 | Smith |
| 5,832,068 A | | 11/1998 | Smith |
| 5,881,131 A | | 3/1999 | Farris et al. |
| 5,966,695 A | | 10/1999 | Melchione et al. |
| 6,021,397 A | | 2/2000 | Jones et al. |
| 6,026,440 A | * | 2/2000 | Shrader et al. ............ 709/224 |
| 6,072,894 A | | 6/2000 | Payne |
| 6,073,140 A | | 6/2000 | Morgan et al. |
| 6,119,103 A | | 9/2000 | Basch et al. |
| 6,128,602 A | | 10/2000 | Northington et al. |
| 6,157,707 A | | 12/2000 | Baulier et al. |

(Continued)

FOREIGN PATENT DOCUMENTS

| | | |
|---|---|---|
| EP | 1 239 378 | 1/2002 |
| EP | 1 301 887 | 4/2003 |

(Continued)

OTHER PUBLICATIONS

BlueCava, "What We Do", http://www.bluecava.com/what-we-do/, printed Nov. 5, 2012 in 3 pages.

(Continued)

*Primary Examiner* — Eleni Shiferaw
*Assistant Examiner* — Nelson Giddins
(74) *Attorney, Agent, or Firm* — Knobbe, Martens, Olson & Bear, LLP

(57) ABSTRACT

In an embodiment, a computing system, such as a monitoring computer, receives a request from a user to monitor an account of the user with an online service provider. The request may include personal information and user preferences for one or more protective actions. The system periodically monitors external data sources for indications of changes to personal information associated with the account, and detects changes or attempted changes to personal information associated with the account. The system may determine risk levels associated with detected changes or attempted changes, and transmit a notification to the user via a communication channel selected based on the determined risk level and/or the user preferences. The system may also initiate protective actions, so that further unauthorized access to the account may be prevented.

20 Claims, 9 Drawing Sheets

(56) References Cited

U.S. PATENT DOCUMENTS

| | | |
|---|---|---|
| 6,182,068 B1 | 1/2001 | Culliss |
| 6,254,000 B1 | 7/2001 | Degen et al. |
| 6,263,447 B1 | 7/2001 | French et al. |
| 6,311,169 B2 | 10/2001 | Duhon |
| 6,343,279 B1 | 1/2002 | Bissonette et al. |
| 6,356,937 B1 * | 3/2002 | Montville et al. ............ 709/206 |
| 6,397,212 B1 | 5/2002 | Biffar |
| 6,457,012 B1 | 9/2002 | Jatkowski |
| 6,523,041 B1 | 2/2003 | Morgan et al. |
| 6,539,377 B1 | 3/2003 | Culliss |
| 6,629,245 B1 | 9/2003 | Stone et al. |
| 6,658,393 B1 | 12/2003 | Basch et al. |
| 6,714,944 B1 | 3/2004 | Shapiro et al. |
| 6,750,985 B2 | 6/2004 | Rhoads |
| 6,766,327 B2 | 7/2004 | Morgan, Jr. et al. |
| 6,796,497 B2 | 9/2004 | Benkert et al. |
| 6,816,850 B2 | 11/2004 | Culliss |
| 6,845,448 B1 | 1/2005 | Chaganti et al. |
| 6,871,287 B1 | 3/2005 | Ellingson |
| 6,892,307 B1 | 5/2005 | Wood et al. |
| 6,928,487 B2 | 8/2005 | Eggebraaten et al. |
| 6,934,714 B2 | 8/2005 | Meinig |
| 6,950,807 B2 | 9/2005 | Brock |
| 6,968,319 B1 | 11/2005 | Remington et al. |
| 6,973,462 B2 | 12/2005 | Dattero et al. |
| 6,988,085 B2 | 1/2006 | Hedy |
| 7,028,013 B2 | 4/2006 | Saeki |
| 7,028,052 B2 | 4/2006 | Chapman et al. |
| 7,039,607 B2 | 5/2006 | Watarai et al. |
| 7,076,462 B1 | 7/2006 | Nelson et al. |
| 7,089,594 B2 | 8/2006 | Lal et al. |
| 7,107,241 B1 | 9/2006 | Pinto |
| 7,194,416 B1 | 3/2007 | Provost et al. |
| 7,200,602 B2 | 4/2007 | Jonas |
| 7,209,895 B2 | 4/2007 | Kundtz et al. |
| 7,234,156 B2 | 6/2007 | French et al. |
| 7,246,740 B2 | 7/2007 | Swift et al. |
| 7,249,113 B1 | 7/2007 | Continelli et al. |
| 7,263,497 B1 | 8/2007 | Wiser et al. |
| 7,289,971 B1 | 10/2007 | O'Neil et al. |
| 7,330,717 B2 | 2/2008 | Gidron et al. |
| 7,343,295 B2 | 3/2008 | Pomerance |
| 7,356,516 B2 | 4/2008 | Richey et al. |
| 7,370,044 B2 | 5/2008 | Mulhern et al. |
| 7,383,988 B2 | 6/2008 | Slonecker, Jr. |
| 7,403,942 B1 | 7/2008 | Bayliss |
| 7,433,864 B2 | 10/2008 | Malik |
| 7,437,679 B2 * | 10/2008 | Uemura et al. ............... 715/805 |
| 7,444,518 B1 | 10/2008 | Dharmarajan et al. |
| 7,458,508 B1 | 12/2008 | Shao et al. |
| 7,467,401 B2 | 12/2008 | Cicchitto |
| 7,480,631 B1 | 1/2009 | Merced et al. |
| 7,503,489 B2 | 3/2009 | Heffez |
| 7,509,117 B2 | 3/2009 | Yum |
| 7,512,221 B2 | 3/2009 | Toms |
| 7,529,698 B2 | 5/2009 | Joao |
| 7,530,097 B2 * | 5/2009 | Casco-Arias et al. ............ 726/6 |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,467 B2 * | 6/2009 | Lindsay ............... 726/5 |
| 7,562,814 B1 | 7/2009 | Shao et al. |
| 7,575,157 B2 | 8/2009 | Barnhardt et al. |
| 7,577,665 B2 | 8/2009 | Ramer et al. |
| 7,580,884 B2 | 8/2009 | Cook |
| 7,587,368 B2 | 9/2009 | Felsher |
| 7,610,216 B1 | 10/2009 | May et al. |
| 7,620,596 B2 | 11/2009 | Knudson et al. |
| 7,623,844 B2 | 11/2009 | Herrmann et al. |
| 7,647,344 B2 | 1/2010 | Skurtovich et al. |
| 7,653,592 B1 | 1/2010 | Flaxman et al. |
| 7,653,600 B2 | 1/2010 | Gustin |
| 7,672,833 B2 | 3/2010 | Blume et al. |
| 7,689,487 B1 | 3/2010 | Britto et al. |
| 7,689,563 B1 * | 3/2010 | Jacobson ............... 707/663 |
| 7,690,032 B1 | 3/2010 | Peirce |
| 7,698,214 B1 | 4/2010 | Lindgren |
| 7,698,217 B1 | 4/2010 | Phillips et al. |
| 7,708,190 B2 | 5/2010 | Brandt et al. |
| 7,711,635 B2 | 5/2010 | Steele et al. |
| 7,725,385 B2 | 5/2010 | Royer et al. |
| 7,747,520 B2 | 6/2010 | Livermore et al. |
| 7,747,521 B2 | 6/2010 | Serio |
| 7,761,384 B2 | 7/2010 | Madhogarhia |
| 7,769,697 B2 | 8/2010 | Fieschi et al. |
| 7,774,270 B1 | 8/2010 | MacCloskey |
| 7,788,040 B2 | 8/2010 | Haskell et al. |
| 7,792,715 B1 | 9/2010 | Kasower |
| 7,793,835 B1 | 9/2010 | Coggeshall et al. |
| 7,841,004 B1 | 11/2010 | Balducci |
| 7,841,008 B1 * | 11/2010 | Cole et al. ............... 726/25 |
| 7,844,520 B1 | 11/2010 | Franklin |
| 7,849,014 B2 | 12/2010 | Erikson |
| 7,853,493 B2 | 12/2010 | DeBie et al. |
| 7,870,078 B2 | 1/2011 | Clark et al. |
| 7,877,304 B1 | 1/2011 | Coulter |
| 7,908,242 B1 | 3/2011 | Achanta |
| 7,909,246 B2 | 3/2011 | Hogg et al. |
| 7,912,865 B2 | 3/2011 | Akerman et al. |
| 7,958,046 B2 | 6/2011 | Doerner et al. |
| 7,966,192 B2 | 6/2011 | Pagliari et al. |
| 7,970,679 B2 | 6/2011 | Kasower |
| 7,975,299 B1 | 7/2011 | Balducci et al. |
| 7,979,908 B2 | 7/2011 | Millwee |
| 7,983,932 B2 | 7/2011 | Kane |
| 8,001,235 B2 | 8/2011 | Russ et al. |
| 8,032,932 B2 | 10/2011 | Speyer et al. |
| 8,037,097 B2 | 10/2011 | Guo et al. |
| 8,055,904 B1 * | 11/2011 | Cato et al. ............... 713/183 |
| 8,060,424 B2 | 11/2011 | Kasower |
| 8,065,233 B2 | 11/2011 | Lee et al. |
| 8,078,453 B2 | 12/2011 | Shaw |
| 8,078,524 B2 | 12/2011 | Crawford et al. |
| 8,078,881 B1 * | 12/2011 | Liu ............... 713/183 |
| 8,099,341 B2 | 1/2012 | Varghese |
| 8,104,679 B2 | 1/2012 | Brown |
| 8,131,777 B2 | 3/2012 | McCullough |
| 8,175,889 B1 | 5/2012 | Girulat et al. |
| 8,195,549 B2 | 6/2012 | Kasower |
| 8,224,723 B2 | 7/2012 | Bosch et al. |
| 8,234,498 B2 | 7/2012 | Britti et al. |
| 8,244,848 B1 | 8/2012 | Narayanan et al. |
| 8,281,372 B1 * | 10/2012 | Vidal ............... 726/5 |
| 8,285,613 B1 | 10/2012 | Coulter |
| 8,285,656 B1 | 10/2012 | Chang et al. |
| 8,312,033 B1 | 11/2012 | McMillan |
| 8,327,429 B2 | 12/2012 | Speyer et al. |
| 8,478,674 B1 | 7/2013 | Kapczynski et al. |
| 8,484,186 B1 | 7/2013 | Kapczynski et al. |
| 8,515,828 B1 | 8/2013 | Wolf et al. |
| 8,515,844 B2 | 8/2013 | Kasower |
| 8,533,118 B2 | 9/2013 | Weller et al. |
| 8,600,886 B2 | 12/2013 | Ramavarjula et al. |
| 8,601,602 B1 * | 12/2013 | Zheng ............... 726/29 |
| 8,646,051 B2 * | 2/2014 | Paden et al. ............... 726/5 |
| 8,725,613 B1 | 5/2014 | Celka et al. |
| 8,818,888 B1 | 8/2014 | Kapczynski et al. |
| 8,856,894 B1 | 10/2014 | Dean et al. |
| 2001/0011245 A1 | 8/2001 | Duhon |
| 2001/0029482 A1 | 10/2001 | Tealdi et al. |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2002/0045154 A1 | 4/2002 | Wood et al. |
| 2002/0059201 A1 | 5/2002 | Work |
| 2002/0077964 A1 | 6/2002 | Brody et al. |
| 2002/0111816 A1 | 8/2002 | Lortscher et al. |
| 2002/0147801 A1 | 10/2002 | Gullotta et al. |
| 2002/0173994 A1 | 11/2002 | Ferguson, III |
| 2002/0198824 A1 | 12/2002 | Cook |
| 2003/0009418 A1 | 1/2003 | Green et al. |
| 2003/0009426 A1 | 1/2003 | Ruiz-Sanchez |

(56) References Cited

U.S. PATENT DOCUMENTS

| | | |
|---|---|---|
| 2003/0023531 A1 | 1/2003 | Fergusson |
| 2003/0061163 A1 | 3/2003 | Durfield |
| 2003/0069839 A1 | 4/2003 | Whittington et al. |
| 2003/0097342 A1 | 5/2003 | Whittingtom |
| 2003/0097380 A1 | 5/2003 | Mulhern et al. |
| 2003/0115133 A1 | 6/2003 | Bian |
| 2003/0158960 A1 | 8/2003 | Engberg |
| 2003/0163733 A1 | 8/2003 | Barriga-Caceres et al. |
| 2003/0171942 A1 | 9/2003 | Gaito |
| 2003/0187837 A1 | 10/2003 | Culliss |
| 2003/0195859 A1 | 10/2003 | Lawrence |
| 2003/0220858 A1 | 11/2003 | Lam et al. |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0024709 A1 | 2/2004 | Yu et al. |
| 2004/0030649 A1 | 2/2004 | Nelson et al. |
| 2004/0039586 A1 | 2/2004 | Garvey et al. |
| 2004/0044628 A1 | 3/2004 | Mathew et al. |
| 2004/0044673 A1 | 3/2004 | Brady et al. |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0128150 A1 | 7/2004 | Lundegren |
| 2004/0133440 A1 | 7/2004 | Carolan et al. |
| 2004/0143596 A1 | 7/2004 | Sirkin |
| 2004/0158723 A1 | 8/2004 | Root |
| 2004/0167793 A1 | 8/2004 | Masuoka et al. |
| 2004/0193891 A1 | 9/2004 | Ollila |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0230527 A1 | 11/2004 | Hansen et al. |
| 2004/0243588 A1 | 12/2004 | Tanner et al. |
| 2004/0249811 A1 | 12/2004 | Shostack et al. |
| 2004/0250107 A1* | 12/2004 | Guo ............... 713/200 |
| 2004/0267714 A1 | 12/2004 | Frid et al. |
| 2005/0010513 A1 | 1/2005 | Duckworth et al. |
| 2005/0021551 A1 | 1/2005 | Silva et al. |
| 2005/0027983 A1 | 2/2005 | Klawon |
| 2005/0055231 A1 | 3/2005 | Lee |
| 2005/0058262 A1 | 3/2005 | Timmins et al. |
| 2005/0071328 A1 | 3/2005 | Lawrence |
| 2005/0091164 A1 | 4/2005 | Varble |
| 2005/0097320 A1 | 5/2005 | Golan et al. |
| 2005/0102180 A1 | 5/2005 | Gailey et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144452 A1 | 6/2005 | Lynch et al. |
| 2005/0154665 A1 | 7/2005 | Kerr |
| 2005/0154769 A1 | 7/2005 | Eckart et al. |
| 2005/0216434 A1 | 9/2005 | Haveliwala et al. |
| 2005/0216955 A1* | 9/2005 | Wilkins et al. ............ 726/23 |
| 2005/0288998 A1 | 12/2005 | Verma et al. |
| 2006/0004623 A1 | 1/2006 | Jasti |
| 2006/0010391 A1* | 1/2006 | Uemura et al. ............ 715/752 |
| 2006/0036543 A1 | 2/2006 | Blagg et al. |
| 2006/0041464 A1 | 2/2006 | Powers et al. |
| 2006/0059110 A1 | 3/2006 | Madhok et al. |
| 2006/0059362 A1* | 3/2006 | Paden et al. ............ 713/184 |
| 2006/0074986 A1 | 4/2006 | Mallalieu et al. |
| 2006/0074991 A1 | 4/2006 | Lussier et al. |
| 2006/0080251 A1 | 4/2006 | Fried et al. |
| 2006/0101508 A1 | 5/2006 | Taylor |
| 2006/0129481 A1 | 6/2006 | Bhatt et al. |
| 2006/0129533 A1 | 6/2006 | Purvis |
| 2006/0161435 A1 | 7/2006 | Atef et al. |
| 2006/0173792 A1 | 8/2006 | Glass |
| 2006/0178971 A1 | 8/2006 | Owen et al. |
| 2006/0184585 A1 | 8/2006 | Grear et al. |
| 2006/0212407 A1 | 9/2006 | Lyon |
| 2006/0218407 A1 | 9/2006 | Toms |
| 2006/0229943 A1 | 10/2006 | Mathias et al. |
| 2006/0229961 A1 | 10/2006 | Lyftogt et al. |
| 2006/0253358 A1 | 11/2006 | Delgrosso et al. |
| 2006/0262929 A1 | 11/2006 | Vatanen et al. |
| 2006/0271457 A1 | 11/2006 | Romain et al. |
| 2006/0277089 A1 | 12/2006 | Hubbard et al. |
| 2006/0294199 A1 | 12/2006 | Bertholf |
| 2007/0005508 A1 | 1/2007 | Chiang |
| 2007/0005984 A1* | 1/2007 | Florencio et al. ............ 713/178 |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0067297 A1 | 3/2007 | Kublickis |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0112667 A1 | 5/2007 | Rucker |
| 2007/0124256 A1 | 5/2007 | Crooks et al. |
| 2007/0156692 A1 | 7/2007 | Rosewarne |
| 2007/0174186 A1 | 7/2007 | Hokland |
| 2007/0174448 A1 | 7/2007 | Ahuja et al. |
| 2007/0174903 A1* | 7/2007 | Greff ............... 726/6 |
| 2007/0240206 A1 | 10/2007 | Wu et al. |
| 2007/0245245 A1 | 10/2007 | Blue et al. |
| 2007/0288355 A1 | 12/2007 | Roland et al. |
| 2007/0288360 A1 | 12/2007 | Seeklus |
| 2007/0294195 A1 | 12/2007 | Curry et al. |
| 2008/0010206 A1 | 1/2008 | Coleman |
| 2008/0010687 A1 | 1/2008 | Gonen et al. |
| 2008/0028446 A1* | 1/2008 | Burgoyne ............ 726/6 |
| 2008/0047017 A1* | 2/2008 | Renaud ............ 726/25 |
| 2008/0052182 A1 | 2/2008 | Marshall |
| 2008/0052244 A1 | 2/2008 | Tsuei et al. |
| 2008/0059364 A1 | 3/2008 | Tidwell et al. |
| 2008/0071682 A1 | 3/2008 | Dominguez |
| 2008/0083021 A1* | 4/2008 | Doane et al. ............ 726/5 |
| 2008/0086431 A1 | 4/2008 | Robinson et al. |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0115226 A1* | 5/2008 | Welingkar et al. ............ 726/28 |
| 2008/0120569 A1 | 5/2008 | Mann et al. |
| 2008/0120716 A1* | 5/2008 | Hall et al. ............ 726/16 |
| 2008/0141346 A1* | 6/2008 | Kay et al. ............ 726/4 |
| 2008/0148368 A1* | 6/2008 | Zurko et al. ............ 726/5 |
| 2008/0154758 A1 | 6/2008 | Schattmaier et al. |
| 2008/0162383 A1 | 7/2008 | Kraft |
| 2008/0175360 A1 | 7/2008 | Schwarz et al. |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201401 A1 | 8/2008 | Pugh et al. |
| 2008/0208735 A1 | 8/2008 | Balet et al. |
| 2008/0222706 A1 | 9/2008 | Renaud et al. |
| 2008/0229415 A1* | 9/2008 | Kapoor et al. ............ 726/22 |
| 2008/0255992 A1 | 10/2008 | Lin |
| 2008/0270295 A1 | 10/2008 | Lent et al. |
| 2008/0281737 A1 | 11/2008 | Fajardo |
| 2008/0288299 A1 | 11/2008 | Schultz |
| 2008/0301016 A1 | 12/2008 | Durvasula et al. |
| 2008/0319889 A1 | 12/2008 | Hammad |
| 2009/0006230 A1 | 1/2009 | Lyda et al. |
| 2009/0037332 A1 | 2/2009 | Cheung et al. |
| 2009/0043691 A1 | 2/2009 | Kasower |
| 2009/0055322 A1 | 2/2009 | Bykov et al. |
| 2009/0064297 A1* | 3/2009 | Selgas et al. ............ 726/6 |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0125972 A1 | 5/2009 | Hinton et al. |
| 2009/0126013 A1 | 5/2009 | Atwood et al. |
| 2009/0157693 A1 | 6/2009 | Palahnuk |
| 2009/0164380 A1 | 6/2009 | Brown |

(56) References Cited

U.S. PATENT DOCUMENTS

| | | | |
|---|---|---|---|
| 2009/0172788 A1* | 7/2009 | Vedula et al. | 726/5 |
| 2009/0172795 A1 | 7/2009 | Ritari et al. | |
| 2009/0177529 A1 | 7/2009 | Hadi | |
| 2009/0199294 A1* | 8/2009 | Schneider | 726/18 |
| 2009/0204599 A1 | 8/2009 | Morris et al. | |
| 2009/0210241 A1 | 8/2009 | Calloway | |
| 2009/0228918 A1 | 9/2009 | Rolff et al. | |
| 2009/0234665 A1 | 9/2009 | Conkel | |
| 2009/0234775 A1 | 9/2009 | Whitney et al. | |
| 2009/0240624 A1 | 9/2009 | James et al. | |
| 2009/0247122 A1* | 10/2009 | Fitzgerald et al. | 455/410 |
| 2009/0254375 A1 | 10/2009 | Martinez et al. | |
| 2009/0254971 A1 | 10/2009 | Herz et al. | |
| 2009/0260064 A1 | 10/2009 | Mcdowell et al. | |
| 2009/0307778 A1 | 12/2009 | Mardikar | |
| 2009/0327270 A1 | 12/2009 | Teevan et al. | |
| 2010/0043055 A1 | 2/2010 | Baumgart | |
| 2010/0049803 A1 | 2/2010 | Ogilvie et al. | |
| 2010/0063993 A1 | 3/2010 | Higgins et al. | |
| 2010/0077483 A1* | 3/2010 | Stolfo et al. | 726/24 |
| 2010/0083371 A1* | 4/2010 | Bennetts et al. | 726/19 |
| 2010/0114744 A1 | 5/2010 | Gonen | |
| 2010/0114747 A1 | 5/2010 | Kasower | |
| 2010/0114776 A1 | 5/2010 | Weller et al. | |
| 2010/0122324 A1* | 5/2010 | Welingkar et al. | 726/5 |
| 2010/0122333 A1 | 5/2010 | Noe et al. | |
| 2010/0136956 A1 | 6/2010 | Drachev et al. | |
| 2010/0153278 A1 | 6/2010 | Farsedakis | |
| 2010/0153290 A1 | 6/2010 | Duggan | |
| 2010/0161816 A1 | 6/2010 | Kraft et al. | |
| 2010/0169159 A1 | 7/2010 | Rose et al. | |
| 2010/0174813 A1 | 7/2010 | Hildreth et al. | |
| 2010/0179906 A1 | 7/2010 | Hawkes | |
| 2010/0185546 A1 | 7/2010 | Pollard | |
| 2010/0217837 A1 | 8/2010 | Ansari et al. | |
| 2010/0223192 A1 | 9/2010 | Levine et al. | |
| 2010/0235897 A1* | 9/2010 | Mason et al. | 726/7 |
| 2010/0241535 A1 | 9/2010 | Nightengale et al. | |
| 2010/0250411 A1 | 9/2010 | Ogrodski | |
| 2010/0257102 A1 | 10/2010 | Perlman | |
| 2010/0262932 A1 | 10/2010 | Pan | |
| 2010/0280914 A1 | 11/2010 | Carlson | |
| 2010/0281020 A1 | 11/2010 | Drubner | |
| 2011/0023115 A1* | 1/2011 | Wright | 726/22 |
| 2011/0029388 A1 | 2/2011 | Kendall et al. | |
| 2011/0035788 A1 | 2/2011 | White et al. | |
| 2011/0071950 A1 | 3/2011 | Ivanovic | |
| 2011/0083181 A1* | 4/2011 | Nazarov | 726/23 |
| 2011/0126275 A1 | 5/2011 | Anderson et al. | |
| 2011/0137760 A1 | 6/2011 | Rudie et al. | |
| 2011/0166988 A1 | 7/2011 | Coulter | |
| 2011/0167011 A1 | 7/2011 | Paltenghe et al. | |
| 2011/0196791 A1 | 8/2011 | Dominguez | |
| 2011/0307397 A1 | 12/2011 | Benmbarek | |
| 2011/0307957 A1 | 12/2011 | Barcelo et al. | |
| 2012/0011158 A1 | 1/2012 | Avner et al. | |
| 2012/0016948 A1 | 1/2012 | Sinha | |
| 2012/0030216 A1 | 2/2012 | Churi et al. | |
| 2012/0030771 A1 | 2/2012 | Pierson et al. | |
| 2012/0047219 A1 | 2/2012 | Feng et al. | |
| 2012/0054592 A1 | 3/2012 | Jaffe et al. | |
| 2012/0072382 A1 | 3/2012 | Pearson et al. | |
| 2012/0084866 A1* | 4/2012 | Stolfo | 726/25 |
| 2012/0110677 A1 | 5/2012 | Abendroth et al. | |
| 2012/0124498 A1 | 5/2012 | Santoro et al. | |
| 2012/0151045 A1* | 6/2012 | Anakata et al. | 709/224 |
| 2012/0173339 A1 | 7/2012 | Flynt et al. | |
| 2012/0215682 A1 | 8/2012 | Lent et al. | |
| 2012/0246060 A1 | 9/2012 | Conyack, Jr. et al. | |
| 2012/0253852 A1 | 10/2012 | Pourfallah et al. | |
| 2012/0290660 A1 | 11/2012 | Rao et al. | |
| 2012/0297484 A1* | 11/2012 | Srivastava | 726/23 |
| 2013/0018811 A1 | 1/2013 | Britti et al. | |
| 2013/0031109 A1 | 1/2013 | Routson et al. | |
| 2013/0031624 A1 | 1/2013 | Britti et al. | |
| 2013/0066775 A1 | 3/2013 | Milam | |
| 2013/0117087 A1 | 5/2013 | Coppinger | |
| 2013/0125010 A1 | 5/2013 | Strandell | |
| 2013/0132151 A1 | 5/2013 | Stibel et al. | |
| 2013/0173449 A1 | 7/2013 | Ng et al. | |
| 2013/0205135 A1 | 8/2013 | Lutz | |
| 2013/0298238 A1* | 11/2013 | Shah et al. | 726/23 |
| 2013/0332342 A1 | 12/2013 | Kasower | |
| 2013/0339249 A1 | 12/2013 | Weller et al. | |
| 2014/0012733 A1* | 1/2014 | Vidal | 705/37 |
| 2014/0032723 A1 | 1/2014 | Nema | |
| 2014/0061302 A1 | 3/2014 | Hammad | |
| 2014/0089167 A1 | 3/2014 | Kasower | |
| 2014/0110477 A1 | 4/2014 | Hammad | |
| 2014/0298485 A1* | 10/2014 | Gardner | 726/27 |

FOREIGN PATENT DOCUMENTS

| | | |
|---|---|---|
| JP | 2005-208945 | 8/2005 |
| KR | 2000-0063313 | 11/2000 |
| KR | 2002-0039203 | 5/2002 |
| KR | 10-2007-0081504 | 8/2007 |
| WO | WO 02/029636 | 4/2002 |
| WO | WO 2005/033979 | 4/2005 |
| WO | WO 2009/064694 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

Hoofnagle, Chris Jay, "Identity Theft: Making the Known Unknowns Known," Harvard Journal of Law & Technology, Fall 2007, vol. 21, No. 1, pp. 98-122.

Iovation, Device Identification & Device Fingerprinting, http://www.iovation.com/risk-management/device-identification printed Nov. 5, 2012 in 6 pages.

Li et al., "Automatic Verbal Information Verification for User Authentication", IEEE Transactions on Speech and Audio Processing, vol. 8, No. 5, Sep. 2000, pp. 585-596.

LifeLock, Various Pages, www.lifelock.com/, 2007.

Ogg, Erica, "Apple Cracks Down on UDID Use", http://gigaom.com/apple/apple-cracks-down-on-udid-use/ printed Nov. 5, 2012 in 5 Pages.

U.S. Appl. No. 12/705,489, filed Feb. 12, 2010, Bargoli et al.

U.S. Appl. No. 12/705,511, filed Feb. 12, 2010, Bargoli et al.

Chores & Allowances. "Do Kids Have Credit Reports?" http://choresandallowances.blogspot.com/2007/10/do-kids-have-credit-reports.html Oct. 15, 2007 as printed May 31, 2011.

Gibbs, Adrienne; "Protecting Your Children from Identity Theft," http://www.creditcards.com/credit-card-news/identity-ID-theft-and-kids-children-1282.php Nov. 25, 2008 as printed Jul. 5, 2011.

ID Theft Assist, "Do You Know Where Your Child's Credit Is?" http://www.idtheftassist.com/pages/story14 Nov. 26, 2007, as printed May 31, 2011.

LifeLock; "How can LifeLock protect my kids and family?" http://www.lifelock.conn/lifelock-for-people/how-we-do-it/how-can-lifelock-protect-my-kids-and-family as accessed Mar. 14, 2008.

Magid, Lawrence, J., Business Tools: When Selecting an ASP Ensure Data Mobility, Los Angeles Times, Feb. 26, 2001, vol. C, Issue 4, pp. 3 pages, Los Angeles, CA.

Ramaswamy, Vinita M., Identity-Theft Toolkit, The CPA Journal, Oct. 1, 2006, vol. 76, Issue 10, pp. 66 (5 pages).

Vamosi, Robert, "How to Handle ID Fraud's Youngest Victims," http://news.cnet.com/8301-10789_3-10105303-57.html Nov. 21, 2008 as printed May 31, 2011.

"Aggregate and Analyze Social Media Content: Gain Faster and Broader Insight to Market Sentiment," SAP Partner, Mantis Technology Group, Apr. 2011, pp. 4.

ABC News Now:Money Matters; as broadcasted Nov. 15, 2005 with guest Todd Davis (CEO of Lifelock); pp. 6.

(56) References Cited

OTHER PUBLICATIONS

Anonymous, "Credit-Report Disputes Await Electronic Resolution," Credit Card News, Chicago, Jan. 15, 1993, vol. 5, No. 19, p. 5.
Anonymous; "MBNA Offers Resolution of Credit Card Disputes," Hempstead, Feb. 2002, vol. 68, No. 2, p. 47.
Bielski, Lauren; "Will you Spend to Thwart ID Theft?"; ABA Banking Journal; Apr. 2005; pp. 54, 56-57, 60.
Buxfer, http://www.buxfer.com/ printed Feb. 5, 2014 in 1 page.
Check, http://check.me/ printed Feb. 5, 2014 in 3 pages.
Comlounge.net, "plonesocial.auth.rpx" http://web.archive.org/web/20101026041841/http://comlounge.net/rpx as captured Oct. 26, 2010 in 9 pages.
"Consumers Gain Immediate and Full Access to Credit Score Used by Majority of U.S. Lenders." PR Newswire, ProQuest Copy; Mar. 19, 2001; p. 1.
"CreditCheck Monitoring Services," Dec. 11, 2000, pp. 1, lines 21-23.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
Day, Jo and Kevin; "ID-ology: A Planner's Guide to Identity Theft"; Journal of Financial Planning:Tech Talk; pp. 36-38; Sep. 2004.
Facebook, "Facebook helps you connect and share with the people in your life," <www.facebook.com> printed Nov. 16, 2010 in 1 page.
FamilySecure.com; "Frequently Asked Questions|FamilySecure.com", http://www.familysecure.com/FAQ.aspx, dated Jul. 15, 2007 on www.archive.org.
"Ficticious Business Name Records", Westlaw Database Directory, http://directoy.westlaw.com/scope/default.asp?db=FBN-ALL&Rs-W...&VR=2.0 as printed Dec. 17, 2009, pp. 5.
"ID Thieves These Days Want Your Number, Not Your Name", The Colombus Dispatch, Columbus, Ohio, http://www.dispatch.com/content/storiesibusiness/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
Information Brokers of America:Child ID Protection Order Form http://iboainfo.com/child-order.html dated Jul. 6, 2008 on www.archive.org.
Information Brokers of America http://iboainfo.com/child-id-protect.html dated Dec. 15, 2007 on www.archive.org.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Manilla, http://www.manilla.com/how-it-works/ printed Feb. 5, 2014 in 1 page.

Meyers et al., "Using Your Social Networking Accounts to Log Into NPR.org," NPR.org, Jun. 24, 2010, http://www.npr.org/blogs/inside/2010/06/24/128079309/using-your-social-networking-accounts-to-log-into-npr-org in 2 pages.
Micarelli et al., "Personalized Search on the World Wide Web," The Adaptive Web, LNCS 4321, 2007, pp. 195-230.
Mint.com, http://www.mint.com/how-it-works/ printed Feb. 5, 2013 in 2 pages.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
"Name Availability Records", Westlaw Database Directory, http://directoy.westlaw.com/scope/default.asp?db=NA-ALL&RS=W...&VR=2.0 as printed Dec. 17, 2009, pp. 5.
Next Card: About Us, http://web.cba.neu.edu/~awatson/NextCardCase/NextCardAboutUs.htm printer Oct. 23, 2009 in 10 pages.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Roth, Andrew, "CheckFree to Introduce E-Mail Billing Serving," American Banker, New York, Mar. 13, 2001, vol. 166, No. 49, pp. 3.
Scholastic Inc.:Parent's Request for Information http://www.scholastic.com/inforequest/index.htm dated Feb. 10, 2007 on www.archive.org.
Scholastic Inc.:Privacy Policy http://www.scholastic.com/privacy.htm dated Jan. 27, 2007 on www.archive.org.
Singletary, Michelle, "The Littlest Victims of ID Theft", The Washington Post, The Color of Money, Oct. 4, 2007.
US Legal, Description, http://www.uslegalforms.com/us/US-00708-LTR.htm printed Sep. 4, 2007 in 2 pages.
Yahoo! Search, "People Search," http://people.yahoo/com printed Nov. 16, 2010 in 1 page.
YODLEE | Money Center, https://yodleemoneycenter.com/ printed Feb. 5, 2014 in 2 pages.
You Need a Budget, http://www.youneedabudget.com/features printed Feb. 5, 2014 in 3 pages.

* cited by examiner

TO: User123 <user123@mail.com>
FROM: ONLINE IDENTITY MONITORING
SUBJECT: PASSWORD CHANGE DETECTED – SEVERE THREAT

— 601

Dear User123,

— 602

We have detected a password change on your account with www.bank.com.

This may be a severe threat of identity theft. Please respond immediately to resolve this issue, by filling in the form below or visiting our website.

— 603

604 ○ I initiated this change, so it may be safely ignored.

605 ● I did not initiate this change. Please take the following actions:

[X] Lock my account temporarily (Default)

[ ] Disable my account

[ ] Notify the credit bureaus

— 606

(SUBMIT)
— 607

FIG. 6

SYSTEMS AND METHODS OF IDENTITY PROTECTION AND MANAGEMENT

BACKGROUND

This disclosure relates to personal information management, and particularly, systems and methods for management of identity and personal information on external services.

Communication systems and network systems such as the Internet enable users to access a multitude of services such as e-commerce services, banking services, credit services, social networking services, and the like. Users often maintain relationships with many of these services. They may have accounts with these services accessed by credentials such as user names and passwords. Furthermore, these services may store personal information of users, such as personal names, relationships with others, home and residence addresses, telephone numbers, credit card numbers, financial information, and so on. Such users often rely on these services to maintain this information, and any compromise to the security or accuracy of this information may impose substantial costs on those users. For example, if an unauthorized person manages to gain access to the user's account and change that user's password, login information, or personal information, then that user may become unable to access his or her account and may be forced to deal with the fallout of identity theft, which can be costly and time-consuming for the user.

In order to prevent such identity theft and unauthorized access, online services often send out notifications of changes to personal information on users' accounts. For example, where a user changes his or her password, online services often send out an email confirmation to notify the user of the password change. Unfortunately, such notifications may become too numerous and burdensome for the user to carefully review to detect fraud and/or identity theft. Additionally, such notifications may be hidden among other communications, such as other emails, and thus not be noticed by the user in a timely manner. For example, notifications may be misclassified as junk mail or spam, possibly resulting in them going unnoticed by the user. Thus, such notifications may be ignored by users and thus become ineffective.

SUMMARY

Accordingly, disclosed herein are systems and methods of management of identity and personal information, such as account information stored by service providers. The systems and methods disclosed herein enable a user to effectively detect relevant events indicative of changes to identity and/or personal information, such as changes to passwords, login information, address information, and other personal information associated with the user's various accounts with service providers. Additionally, the systems and methods disclosed herein may enable the user to specify automatic actions to be taken in response to such events. Thus, the user may be relieved of the need to manually monitor and/or respond to such events and may be enabled to rapidly respond to those events.

In one embodiment, a method of monitoring and handling potential identity theft threats is performed by a monitoring computer having one or more computer processors. The monitoring computer receives a request from a user to monitor an account of the user with an online service provider. The request includes personal information associated with the user and user preferences for one or more protective actions to be taken in response to detection, by the monitoring computer, of a change or attempted change to personal information associated with the account. The monitoring computer periodically monitors one or more external data sources for indications of changes to personal information associated with the account. The monitoring computer detects a change or attempted change to personal information associated with the account. The monitoring computer determines a risk level associated with the detected change or attempted change to personal information associated with the account. The monitoring computer transmits a notification to the user via a communication channel selected based on the determined risk level and/or the user preferences. The monitoring computer initiates one or more protective actions selected based on one or more of the determined risk level or the user preferences. Further unauthorized access to the account may be prevented by the one or more actions.

In an embodiment, periodically monitoring one or more external data sources for indications of changes to personal information comprises periodically connecting to an external service, providing the external service with login credentials associated with the user, and determining whether the external service accepts the provided login credentials.

In an embodiment, periodically monitoring one or more external data sources for indications of changes to personal information comprises periodically retrieving electronic messages associated with the user and analyzing the content of the retrieved messages to determine whether any of the messages indicates a change to personal information.

In an embodiment, the risk level may be determined at least in part based on whether a preauthorization for the change or attempted change to personal information was received.

In an embodiment, the one or more protective actions are initiated subsequent to receiving user approval for initiating the one or more protective actions.

In an embodiment, the one or more protective actions are initiated without requiring user approval for initiating the one or more protective actions.

In one embodiment, a computing system is configured to monitor and handle potential identity theft threats. The computing system includes a computer-readable storage medium having stored thereon a plurality of executable software modules. The computing system includes one or more computer processors configured to execute the plurality of software modules stored on the computer-readable storage medium. The computing system includes a network interface. The computing system includes a message monitoring module configured to retrieve an electronic message and determine whether the electronic message indicates a change or a possible change to personal information. The computing system includes an event notification module configured to determine a risk level associated with the electronic message in response to the message monitoring module determining that the electronic message indicates a change or a possible change to personal information. The event notification module may be further configured to execute one or more user-customizable responsive actions based upon the risk level associated with the electronic message as determined by the event notification module.

In an embodiment, the message monitoring module may be configured to retrieve the electronic message by automatically logging into one or more email accounts and gathering messages from the one or more email accounts.

In an embodiment, the message monitoring module may be configured to retrieve the electronic message by receiving messages sent to the computing system.

In an embodiment, at least one of the user-customizable responsive actions may be sending an electronic notification identifying the possible change to personal information.

In an embodiment, the event notification module may be configured to execute at least a portion of the user-customizable responsive actions only in response to receiving a user confirmation message.

In an embodiment, the user-customizable responsive actions are selected based upon stored user preferences and the risk level associated with the electronic message.

In an embodiment, the event notification module may be further configured to determine whether the possible change to personal information was preauthorized, and further configured to execute different user-customizable responsive actions if the possible change to personal information was preauthorized.

In an embodiment, a non-transitory computer-readable medium comprises executable instructions configured to cause one or more computer processors to perform operations such as the following. The system periodically determines whether a network service is accessible based on a set of user credentials, by performing operations on a periodic basis. The system transmits a login request to the network service. The login request comprises the user credentials formatted in accordance with a protocol used by the network service. The system receives a login response from the network service. The system determines whether the login response indicates that the network service did not accept the user credentials. The system, in response to a determination that the login response indicates that the network service did not accept the user credentials, performs one or more event responses, selected based at least upon user preferences relating to the network service.

In an embodiment, transmitting a login request to the network service comprises transmitting an HTTP request to the network service.

In an embodiment, determining whether the login response indicates that the network service did not accept the user credentials comprises comparing the login response to one or more predefined parsing rules associated with the network service.

In an embodiment, at least one of the event responses may be sending an electronic notification identifying the possible change to personal information.

In an embodiment, at least a portion of the event responses may be performed only in subsequent to receiving a user confirmation message.

In an embodiment, the event responses may be selected based upon a risk level determined based on the login response.

In an embodiment, the operations may also include determining whether the possible change to personal information was preauthorized. The event responses are selected based at least in part on whether the possible change to personal information was preauthorized.

BRIEF DESCRIPTION OF THE DRAWINGS

FIG. 6 is a sample notification email that may be sent in response to an event as used in an embodiment.

DETAILED DESCRIPTION

Figure 1:
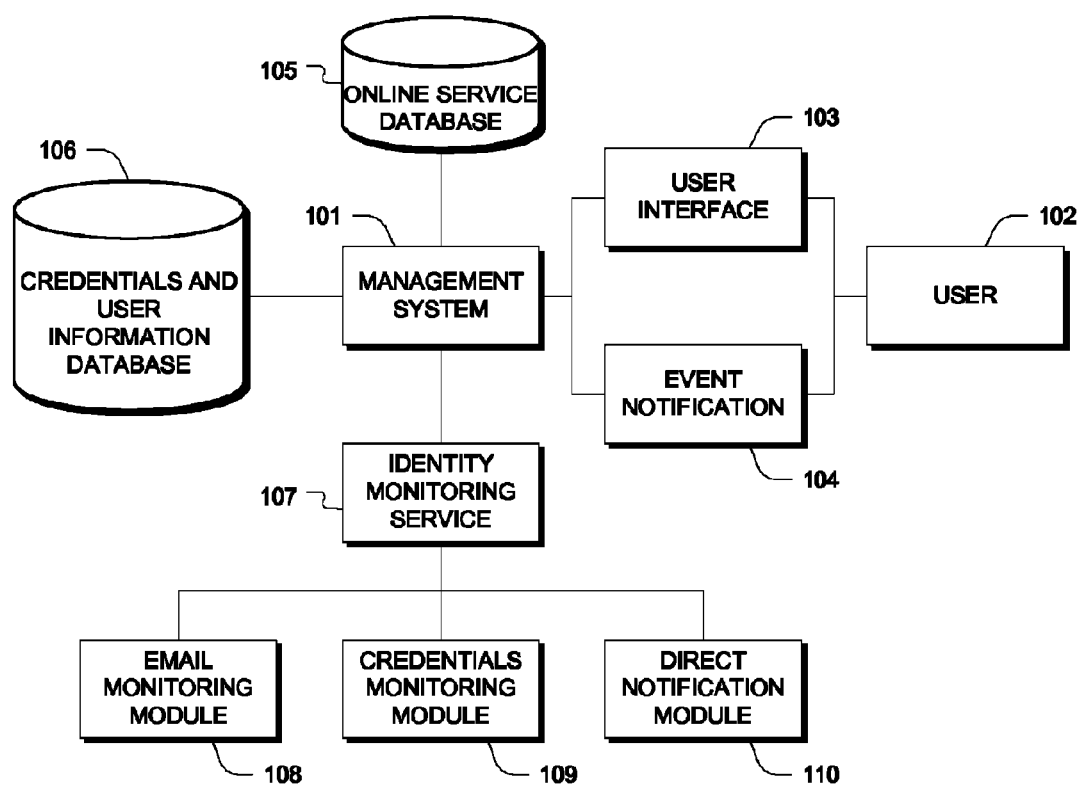
FIG. 1 is a block diagram representing a system of identity protection and management as used in an embodiment.

FIG. 1 is a block diagram of a system of identity protection and management, as used in an embodiment. The system may comprise one or more computing devices, and various elements depicted in FIG. 1 may be included in a single computing device, in separate individual computing devices, or in any combination thereof. The computing device or devices implementing the system of FIG. 1 may be connected to one or more networks such as the Internet by which they may communicate with external entities and data sources.

In an embodiment, the system comprises a management system 101 which performs methods of identity protection and management, as described throughout this specification. Management system 101 may provide various interfaces by which users 102 may access data on the management system. For example, the management system may provide one or more user interfaces via module 103 that may be accessed by users 102. Such user interfaces may include, for example, HTML interfaces, mobile device or tablet computer application interfaces, RSS feeds, audiovisual interfaces, textual interfaces, application programming interfaces, and the like. Additionally, management system 101 may enable users 102 to access data via event notifications module 104. Such event notifications may be sent by any number of means, including, for example, email, text message, instant message, telephone communications, physical mail, and other forms of communication known to those of skill in the art. Management system 101 may provide further interfaces to users 102, other than those provided by modules 103 and 104, as may be known to those of skill in the art.

Management system 101 may have access to various data repositories, in an embodiment. The data repositories may be any of various forms of data storage that may be accessed by a computing system, such as hard drives, tape drives, flash memory, random-access memory, read-only memory, EEPROM storage, and so on, as well as any combination thereof. The data may be formatted within the repositories in one or more formats, referred to herein as "data structures," such as flat text file storage, relational databases, non-relational databases, XML, comma-separated values, Microsoft Excel files, and so on, as well as any combination thereof. The data repositories may provide various forms of access to the stored data, such as by filesystem access, network access, a SQL protocol (e.g. ODBC), HTTP, FTP, NFS, CIFS, and so on, as well as any combination thereof. As used throughout this specification, the terms "data store," "repository," "storage device," and the like may refer to any such data repository as described herein or otherwise known to those of skill in the art.

In an embodiment, management system 101 may be connected to online service data repository 105 which may include information on various online services such as website services, social networking services, online banking services, e-commerce services and the like. The data included in repository 105 may include data such as a URL and/or location for an online service, types of login credentials for the online service, methods of accessing and providing credentials for the online service, forms of communication used by the online service such as email notifications, data provided by the online service and so on.

In an embodiment, repository 105 receives information on an online service by manual entry performed by an operator or administrator of management system 101. In an embodiment, management system 101 includes automated software routines that gather appropriate information from online services, so that repository 105 may be populated and/or updated automatically. In an embodiment, management system 101 receives information descriptive of online services directly from those online services, and may use that descriptive information to populate repository 105.

Additionally, management system 101 may be in communication with credentials and user information repository 106. The repository may be physically stored on the same storage medium as repository 105 or on different storage media, and the two repositories may be implemented in a single repository in an embodiment. The credentials and user information repository 106 may include information about individual users and user accounts. Such information may include login credentials to access the management system so that users may establish accounts and utilize the services provided by the management system. Additionally, repository 106 may include information about users' online identities. Such information may include, for example, login credentials for various online services, types of identities of services to be monitored, types of services to be monitored, preferences for monitoring of online services, preferences for notifications, preferences for levels of urgency for notifications, and the like.

Management system 101 may include or be connected to identity monitoring service 107. The identity monitoring service may provide periodic or on-demand monitoring of online identity and personal information. For example, identity monitoring service 107 may execute an email monitoring module 108 configured to monitor user emails. Such monitoring may be performed either immediately upon receipt of emails for individual users or on a periodic basis by retrieving relevant emails from a user's account. Identity monitoring service 107 may also execute a credentials monitoring module 109 which may be configured to periodically attempt to access various online services on behalf of users and retrieve personal information associated with those users in order to detect changes or updates to identity and personal information associated with those users. Identity monitoring service 107 may further execute a direct notification module 110 which may be configured to directly receive information about identity and personal information changes from one or more online services. Such direct notifications may be received through standard network protocols such as HTTP or specialized communication protocols including secure communication protocols established with online services.

In an embodiment, monitoring service 107 performs various monitoring tasks, as described previously or as may be contemplated otherwise, to detect events. Events may be related to changes in identity and/or personal information maintained by a service. For example, if a user's login name, password, or other authentication credentials are changed on an online service, the change may be detected by monitoring service 107, thus triggering an event. Monitoring service 107 may also be configured to detect changes to personal information stored online, such as address information, as a type of event. An event indicating an address change could inform a user, for example, of an unauthorized attempt to cause goods or services to be delivered to a different location, which would be a form of identity theft. Other activities may also be considered events by the system, such as online orders or service requests. If the monitoring service 107 is able to trigger events in response to unauthorized online orders or service requests, then the system may be able to stop the orders from being shipped or the services being performed, thus again minimizing the impact of identity theft.

Figure 2:
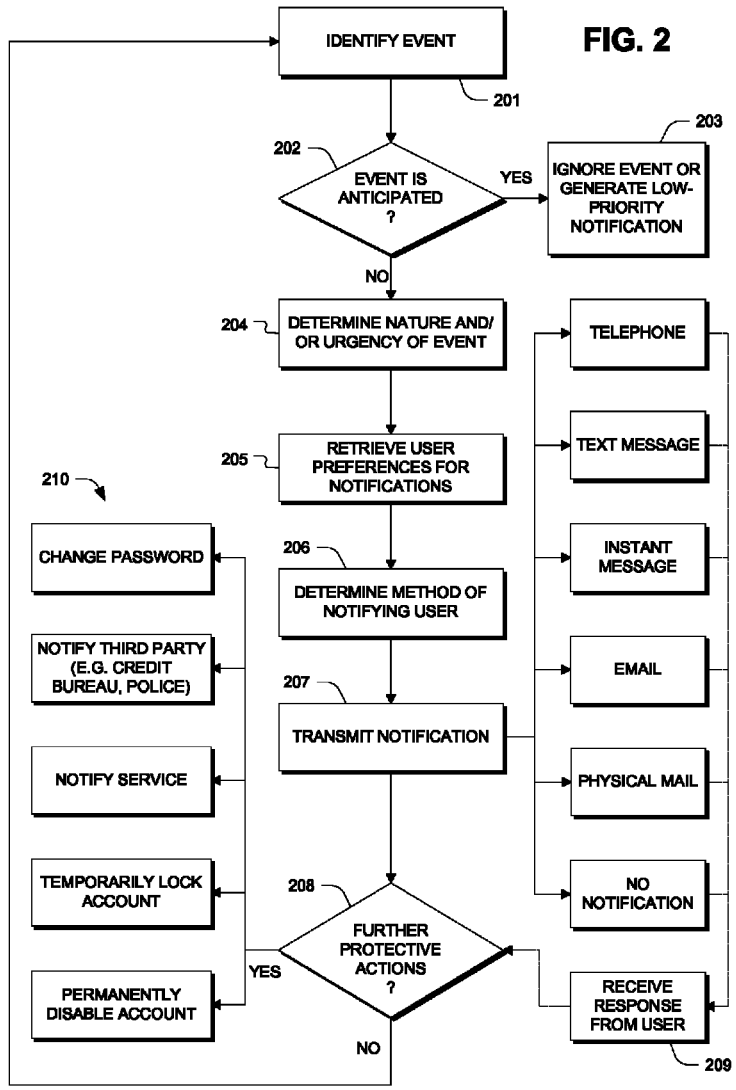
FIG. 2 is a flow chart of a process of handling a detected event as used in an embodiment.

FIG. 2 is a flow chart of a process of handling and/or responding to a detected event as used in an embodiment. Such a process may be used by the event notification module 104 of management system 101 as shown in FIG. 1. In various embodiments, additional blocks may be included, some blocks may be removed, and/or blocks may be connected or arranged differently from what is shown.

At block 201, an event is identified. Such an event may be triggered by one of any number of modules such as the user email module 108, credentials monitoring module 109, or direct monitoring module 110 of the identity monitoring service 107 as shown in FIG. 1. The event identified at block 201 may, in various embodiments, include information about an associated user, an associated online service, personal information associated with the event, other relevant information, or any combination thereof.

At block 202, the system determines whether or not the event identified at block 201 was anticipated. An event may be anticipated, for example, because a user has intentionally caused a change to that user's personal information. For example, where a user decides to change a password or an online account, the password change may be anticipated because it was intended by the user.

The determination of whether an event is anticipated may be based on preauthorization data which includes information provided by users about which events to anticipate. Users may provide preauthorization for events by contacting the system and indicating that a particular event is to be anticipated, via a web interface, mobile application, or other means. Additionally or alternatively, algorithms including artificial intelligence algorithms may be used to determine whether an event is anticipated or how likely an event is to be non-anomalous, known, and/or authorized by the user. Such algorithms may be similar to, for example, algorithms used to detect credit card fraud, as will be known to those of skill in the art.

If the event is anticipated, then at block 203, the system ignores the event or alternatively generates a low-priority notification and/or response. This provides the advantage that the user will only be notified of unexpected and/or important events, so that the user will not be inundated with unnecessary notifications.

If the event is not anticipated then at block 204 the system determines the nature, urgency, and/or other characteristics of the event. This determination may be based on any number of factors including, for example, the nature of the event identified, user preferences stored by the system, frequency of events identified with respect to this user or other users on the system, general information maintained by the system regarding trends in identity fraud, and other information that may be available to the system.

At block 205, the system retrieves user preferences for notifications. These user preferences may be retrieved from one or more data repositories such as repository 106 shown in FIG. 1. Then, based on the nature and urgency of the event determined at block 204, the user preferences retrieved at block 205, and/or other information available to the system, the system may determine at block 206 an appropriate event response, such as a method of notifying the user of the identified event. The system may then generate a notification 207 to be provided to the user by any number of forms of communication known to those of skill in the art, including, telephone notifications, text messages, instant messages, email messages, physical mail messages and/or other forms of communication, as well as any combination thereof. In an embodiment, the system may determine that no notification is required and thus send no notification to the user. In an embodiment, the system may use default preferences provided by an administrator of the system or built into the system in addition to, or rather than, user preferences.

At block 208, the system determines whether further event responses, such as protective actions, are to be taken in response to the event that has been identified, and what actions to take, if any. The determination of further protective actions at block 208 may occur immediately after the determination of the method to notify the user at block 206, or it may occur at a later time. In an embodiment, the system first sends out a notification 207 and then waits to receive a response from the user, at block 209. Such a system enables the user to choose not to perform the protective actions, for example because the triggering event was actually caused by the user, but possibly not preauthorized. In an embodiment, the system may determine whether to wait for a user response at block 209 based on user preferences determined at block 205 or based on other information available to the system. In an embodiment, the system may perform some actions automatically and other actions only after user response.

The protective actions determined at block 208 may include any number of protective actions 210. Such actions may include notifying a third party such as a credit bureau or the police, notifying the online service, temporarily locking the user's account on the service, temporarily or permanently disabling the user's account on the service, changing the user's password on the service, or other actions that may be described throughout this specification or known to those of skill in the art.

Figure 3:
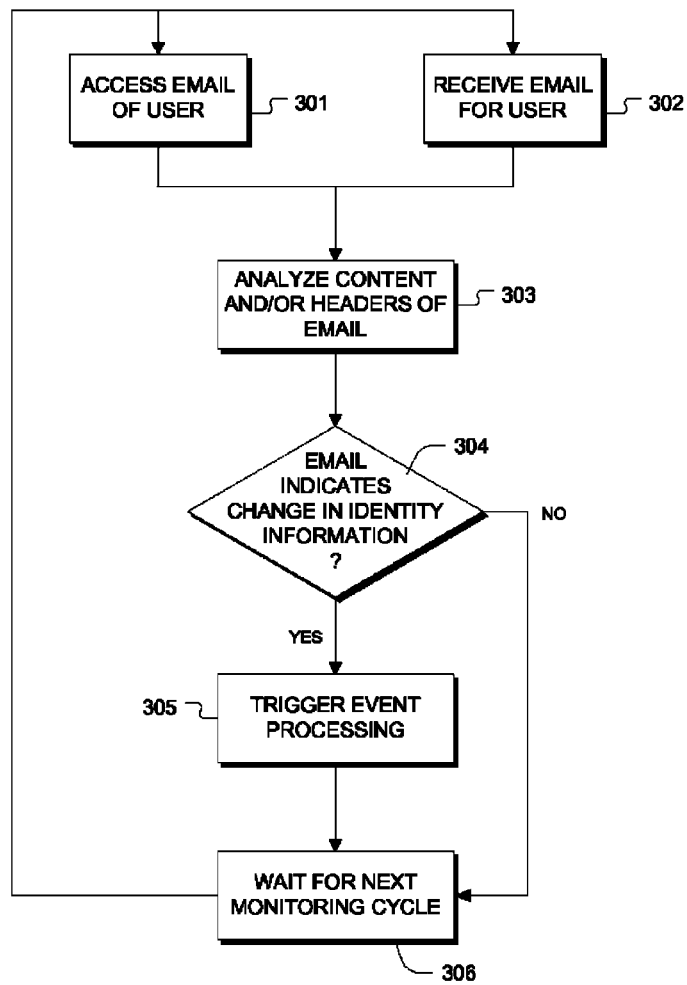
FIG. 3 is a flow chart of a process of analyzing messages for personal information change data as used in an embodiment.

FIG. 3 shows a flow chart of a process of reviewing emails for identity or personal information changes, as used in an embodiment. In various embodiments, additional blocks may be included, some blocks may be removed, and/or blocks may be connected or arranged differently from what is shown.

Although the process of FIG. 3 is described with respect to email messages, the process may be applied to other forms of communication as will be known to those of skill in the art. For example, the system may be configured to receive and analyze text messages received on the user's cell phone. In another embodiment, the system may be configured to automatically review physical mail that may have been, for example, scanned in by the user.

The system may access emails in any number of ways. For example, at block 301, the system may directly access the user's email. This may be done, for example, by the system maintaining the user's email account, login and password and periodically accessing the user's email account to retrieve messages. Such retrieval may be performed via an online interface such as a web interface, an IMAP interface, a POP interface, or the like. Alternatively or additionally, the system may receive emails for the user directly at block 302. For example, the user may configure one or more email accounts to automatically forward and/or copy all messages to a specialized email address operated by the system so that the system may receive messages immediately. In an embodiment, the user may maintain one or more email accounts on the system, in which case all messages may be delivered to the system or otherwise accessed so that they may be reviewed.

Upon accessing one or more messages from block 301, from block 302, and/or by other means, the system analyzes the content and/or headers of the email messages at block 303. The data analyzed by the system at block 303 may include any data associated with an email message such as the sender of the message, the recipient of the message, the time and date of the message, the subject line of the message, any Internet headers included in the message, digital signatures attached to the message, attachments to the message, images included in the message, the content of the message, MIME parts of the message, Internet addresses such as IP addresses associated with the message, and so on. For example, the system may identify messages containing the terms "password change," "address change," "email address change," "account created," "account modified," "account removed," and so on. In various embodiments, the parameters such as keywords to be identified may be manually configured, or they may be automatically determined by an automated process such as a machine learning process, Bayesian analysis, neural network processing, and so on.

In an embodiment, the system may be configured to recognize one or more specialized headers in the message. Such a specialized header may be used, for example, by an online service to enable the automatic detection of messages relating to personal information changes. For example, when a user changes a login name or password on an online service account, the online service may be configured to send an email to that user with a specialized header indicating that the message relates to a login name or password change. In an embodiment, such a specialized header may include one or more digital signatures to provide verification that the message originated from the online service.

At block 304, the system determines whether the email indicates a change in identity information based on the analysis performed at block 303. Such identity information changes may include changes to the user's login name, password, personal name, account number, associated accounts, home address, mailing address, telephone number, email address, or the like. In an embodiment, the system detects attempted changes as well as or alternatively to successful changes, in which case the system may provide notifications as to attempted changes.

If at block 304 the system determines that the email indicates a change (or attempted change) in identity information, then at block 305 the system triggers an event for processing. This triggering of an event may invoke an event notification process, such as that shown in FIG. 2, which determines whether a notification should be transmitted, and attributes of the notification. In an embodiment, at block 305, the event is processed (e.g. by the process outlined in FIG. 2) immediately upon the determination that the email indicates a change in identity information. In an alternate embodiment, the system may initiate event processing at block 305 on a regular or periodic basis such as once every hour, once every day, or once every week. Whether the event is processed immediately or at a later time may depend on user preferences and/or the nature of the event, including the urgency of the event.

If the email is determined not to indicate a change in identity information at block 304 or after the event is processed at block 305, the system waits for the next monitoring cycle at block 306. The system may be configured to perform the monitoring shown in blocks 301 or 302 on a periodic basis such as a daily, weekly, or monthly basis. In such a case, the system would, at block 306, wait for the appropriate period of time to elapse prior to again reviewing messages. In an additional embodiment, the system may wait at block 306 for further messages to be received prior to again performing either of block 301 or 302.

Figure 4:
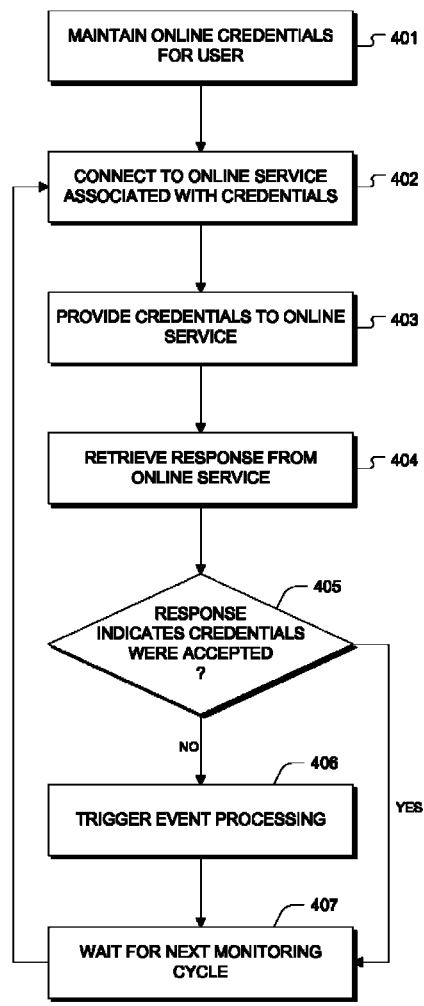
FIG. 4 is a flow chart of a process of verifying credentials with a service as used in an embodiment.

FIG. 4 is a flowchart of a process of verifying credentials with an online service, as used in an embodiment. Although this process is described with respect to an online service connected via a network such as the Internet, this process may equally be applied to services accessible by other forms of communication. For example, this process may be applied to telephone services by automatically dialing and providing information to such services. In various embodiments, additional blocks may be included, some blocks may be removed, and/or blocks may be connected or arranged differently from what is shown.

At block 401, the system maintains online credentials for a user. These online credentials may include a login name and a password. Other information that may be used to authenticate users to online services may also be stored at block 401.

At block 402, the system connects with an online service associated with the credentials maintained at block 401. The system may connect with the online service by any number of means. For example, it may attempt to access the main web page of the online service or it may attempt to access a login page of the online service. In another embodiment, the system may access a special application programming interface (API) provided by the online service. Such an API may be an HTML based API such as a SOAP API or a REST API. In an embodiment, the communications performed at block 402 are performed over a secure channel. In an embodiment, the system maintains instructions for how to connect with the online service at block 402 in one or more repositories such as the online service repository 105 of FIG. 1.

At block 403, the system provides the credentials maintained at block 401 to the online service to which the system has connected at block 402. The system may be configured to provide those credentials to the online service in a manner expected by the online service. The appropriate manner of providing those online credentials may be stored in a repository such as online service repository 105 in FIG. 1.

In an embodiment, the credentials are provided over a secure communications channel. In an embodiment, the credentials may be provided by an HTTP protocol such as an HTTP POST form submission. In an embodiment, the credentials may be transmitted using an HTTP Basic or Digest authentication protocol. In other embodiments, the credentials may be transmitted using a challenge/response protocol, a digital signature, or by other means. Additionally and/or alternatively, the credentials, or any part of the credentials such as a password, may be encrypted or may be obfuscated using a hash function, such as a cryptographic or one-way hash function.

At block 404, the system retrieves a response from the online service, subsequent to the system providing the credentials at block 403. The system may interpret and/or parse the response based on information about the online service, such as information stored in repository 105 of FIG. 1. At block 405, the system analyzes the response retrieved at block 404 to determine whether the response indicates that the credentials were accepted. Such a determination may be specific to particular online services, may depend on the nature of the content received, and/or may be based on parsing of the response data for inclusion of content indicative of whether the credentials were accepted. For example, where the content is a webpage indicating that the password was not correct, then the system may determine that the credentials were not accepted.

If the credentials are not accepted at block 405, then at block 406 the system triggers an event for processing. Such triggering of an event may invoke the performance of a process such as that shown in FIG. 2. As explained previously with respect to FIG. 3, the triggering of the event at block 406 may be performed immediately in response to the determination that the credentials were not accepted or it may be performed at a later time.

If the response indicates that the credentials were accepted at block 405 or after the event is processed at block 406, the system waits for the next monitoring cycle at block 407. The particular intervals at which the system performs the monitoring of online credentials may be specified by the user as a preference. Alternately, the system may include a default period for monitoring. In an embodiment, the system waits for a predefined action that indicates that the credentials should be tested, such as a user-initiated request or a notification from the online service being monitored.

Figure 5A:
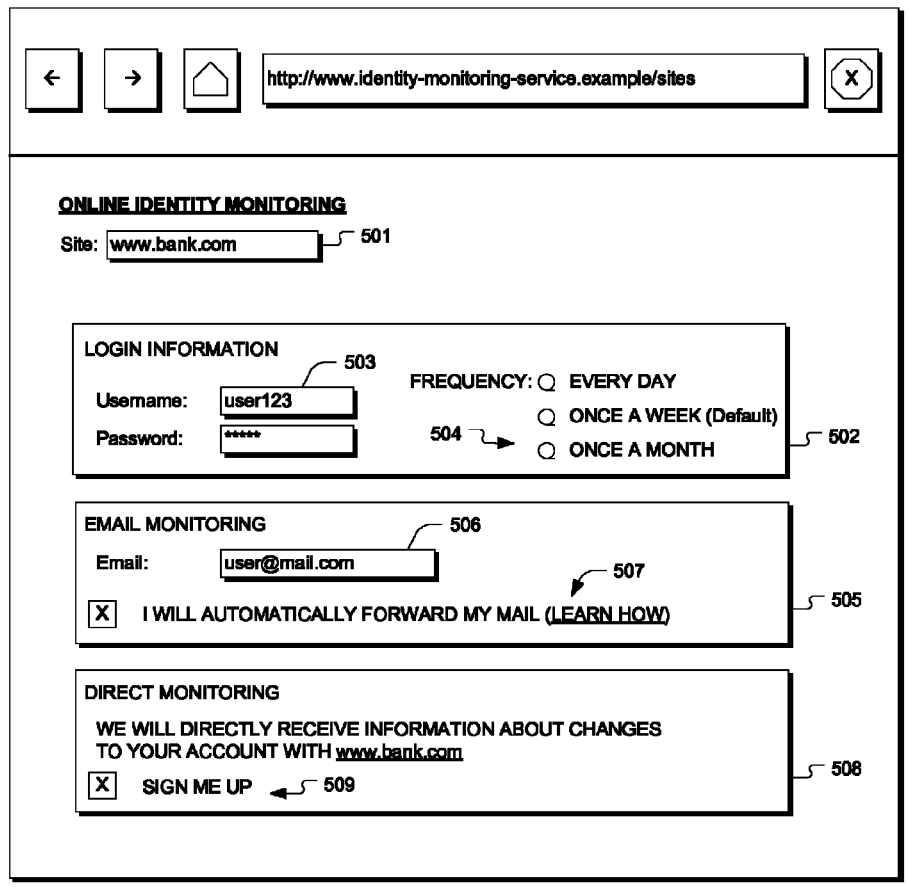
FIGS. 5A and 5B are sample user interfaces for specifying monitoring services as used in an embodiment.
Figure 5B:
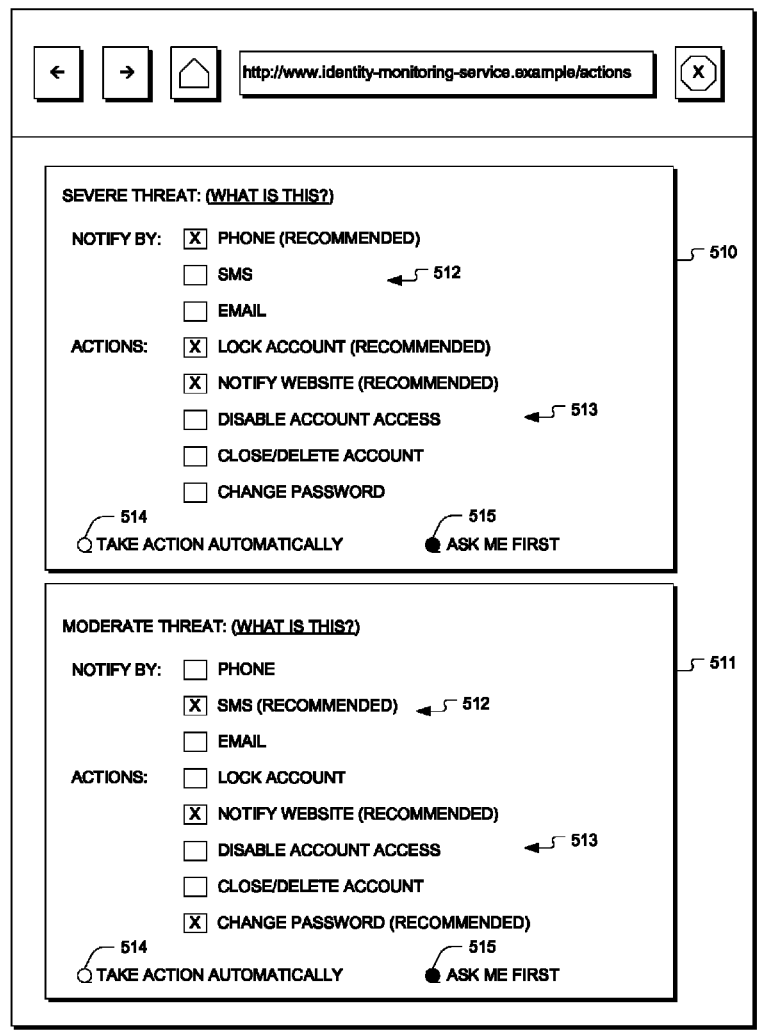

FIGS. 5A and 5B depict sample user interfaces for specifying monitoring services, as used in an embodiment. A user may use such interfaces to manage the performance of monitoring services such as those shown in FIGS. 3 and 4. Additionally, the user may use such interfaces to manage the handling of event notifications and other protective actions such as those shown in FIG. 2. In an embodiment, the system may provide these interfaces to a user computing device or other device by means of a website, a mobile phone application, a tablet device application, a telephone call system, an application programming interface or by other means of communication. In an embodiment, multiple interfaces may be provided.

FIG. 5A illustrates an embodiment of an interface for establishing email monitoring preferences. In this embodiment, the user is able to select an online service using interface element 501. The user may select an online service by typing in a name and/or URL of the online service. In an embodiment, the user may alternatively select the online service using a predefined list. In other embodiments, the user may select the online service by other means. In an embodiment, the user may be able to specify the methods of monitoring a service, thus possibly enabling the user to monitor services not already known to the system.

The user may provide options for online credentials verification using the interface elements shown in block 502. Such information may be used to control a process such as that shown in FIG. 4. The user may provide login credentials such as a user name and password using interface elements 503. Additionally, the user may provide information such as the frequency of monitoring using interface elements 504. The system may request additional information or less information depending on the particular requirements of the monitoring service provided by the system.

The user may configure email monitoring services using the interface elements included in block 505. The information provided in block 505 may be used to configure the performance of a method such as that shown in FIG. 3. For example, the user may provide an email address to be monitored using interface element 506. In an embodiment where the user wishes to have the system retrieve emails from the specified account, the user may provide login and password information or other login information to the system. In another embodiment, the system may be configured to have access to certain email services so that login credentials are not required for the email monitoring service to function.

Additionally, the user may choose to forward emails to the system and may indicate a desire to do so at using interface element 507. Upon selecting this interface the system may provide instructions to the user as to how to forward email to the system. Additionally, the system may configure itself to receive emails and perform monitoring on those emails.

The user may configure direct monitoring of the selected online service using the interface elements shown in block 508. To enable direct monitoring, the user may select interface element 509. Selection of this interface element may cause the system to periodically query the online service for identity or personal information changes. The user may be provided with options for how frequently the monitoring is to be provided. Alternatively, selecting interface element 509 may cause the system to notify the online service of the user's interest in identity and personal information monitoring. Such a request may cause the online service, based on a prior agreement between the system and the online service, to send notifications to the system in response to the online service detecting changes (and/or attempted changes) to the user's identity or personal information. Such monitoring has the advantage that the system may only receive notifications about verified and actual information changes rather than likely information changes detected either through online monitoring, email monitoring or by other means.

In the embodiment shown in FIG. 5, the various forms of monitoring are associated with a particular site provided using interface element 501. In other embodiments, some or all of the forms of monitoring need not be associated with a particular site. For example, a user may be able to use email monitoring, in which case the system may, upon detecting a message of interest, determine a site or online service associated with the message and perform actions based on that message. Similarly, the user may sign up for direct monitoring without specifying a particular site, and the system would process events based on any notifications relating to the user and received from online services. Such embodiments may thus relieve the user of having to manually specify every site or service to be monitored.

Where the system provides other monitoring means, the interface shown in FIG. 5A may include further sections and interface elements to receive configuration settings for those monitoring means. In embodiments that do not implement all the monitoring means shown in FIG. 5A, the interface may be adjusted accordingly.

Turning to FIG. 5B, the system may present a user interface for specifying responses to detected events. The information provided by the user in such an interface may be used to configure the performance of a method such as that shown in FIG. 2.

In an embodiment the interface includes options for various threat or urgency levels. For example, options for severe threats are shown in box 510. Options for moderate threats are shown in box 511. Other levels of threats may also be included on this interface and/or other interfaces. Additionally, in other embodiments the system may categorize threats using different terminology or different categorizations. For example, the system may categorize events as password change events, address change events, login name change events, and so on. In such a case, the interface of FIG. 5B may display boxes for types of event categories. In an embodiment, the categorizations may be account-dependent and/or user-defined.

In an embodiment, the system provides options for notification and/or actions to be taken in response to particular events. For example, interface elements 512 provide options for notification delivery options in response to a severe threat. Interface elements 513 provide options for actions to be taken in response to a severe threat. In an embodiment the system indicates that certain notifications and/or actions are recommended. In an embodiment the recommended notification and/or actions are selected by default.

Additionally, the interface provides options for when the action should be taken. For example using element 514 the user may request to take an action automatically upon detection of the events. Using element 515, the user may request that the system ask the user before taking any further actions. In an embodiment, the recommended actions and/or notifications may change based on whether the user wishes to be asked before taking the action or taking the action automatically. In an embodiment, the interface may provide further controls for specifying that some actions are to be taken without user confirmation, and other actions are to be taken only after user confirmation.

The recommended actions may be dependent as well upon the threat level of the events. As shown in interface elements 514 and 515, the recommended notifications and actions may differ for moderate threats as opposed to severe threats. Thus, the system may recommend levels of notification and/or actions that are appropriate to particular threats, so that users need not select forms of notification and/or actions without prior suggestion.

FIG. 6 shows a sample notification email sent in response to an event, as used in an embodiment. The notification may be sent by any number of means such as by email, by text message, by voicemail, by telephone call, via a mobile phone application, via a portable computer application, or by other means.

The notification message includes pertinent information relating to the detected events. For example, the notification shows in subject line 601 that the event is a password change and that it is a severe threat. The notification message may also indicate the online service at which the event was detected 602 and it may provide information about responding to the event 603. Additionally, in an embodiment, the notification message may include a link to the content that triggered the event and/or a copy, snippet, summary, or other representation of the content that triggered the event, such as the email from the online service or the page returned by the attempted login.

In an embodiment, the notification message may provide options for the user to respond to the event. By providing these options in the notification message itself, the system provides users with the benefit of being able to respond quickly and informedly to the detected events. In an alternate embodiment, the notification message may provide a link or other mechanism by which the user may access a website, mobile phone application, or other interface for responding to the event. Such an interface may appear much like the interface described below with respect to FIG. 6.

In the embodiment shown in FIG. 6, the user may indicate using interface element 604 that the event was initiated by the user so that it may be ignored. If the user did not initiate the change, however, then the user may select interface element 605 and further select actions to be taken using interface elements 606. In an embodiment, interface elements 606 are only displayed if interface element 605 is selected to indicate that the event was not initiated by the user. In an embodiment, the elements 606 that are selected by default are based on preferences provided by the user, for example, using an interface such as that shown in FIG. 5B.

Notification email may also include an interface control 607 to enable the user to submit the information provided using element 604, 605, and 606. Upon submitting this information to the system, the system may then undertake the appropriate actions by for example applying block 208 as shown in FIG. 2.

Other embodiments of the notification message shown in FIG. 6 may be used, and may include different information from that shown. In an embodiment, the contents of the notification message are customized to the particular type of event detected. In an embodiment, where some actions have already been taken, the notification message may include information indicating the results of the actions taken. In an embodiment, upon the user requesting certain actions to be taken using the notification message, a further message confirming the results of those actions is sent to the user.

Figure 7:
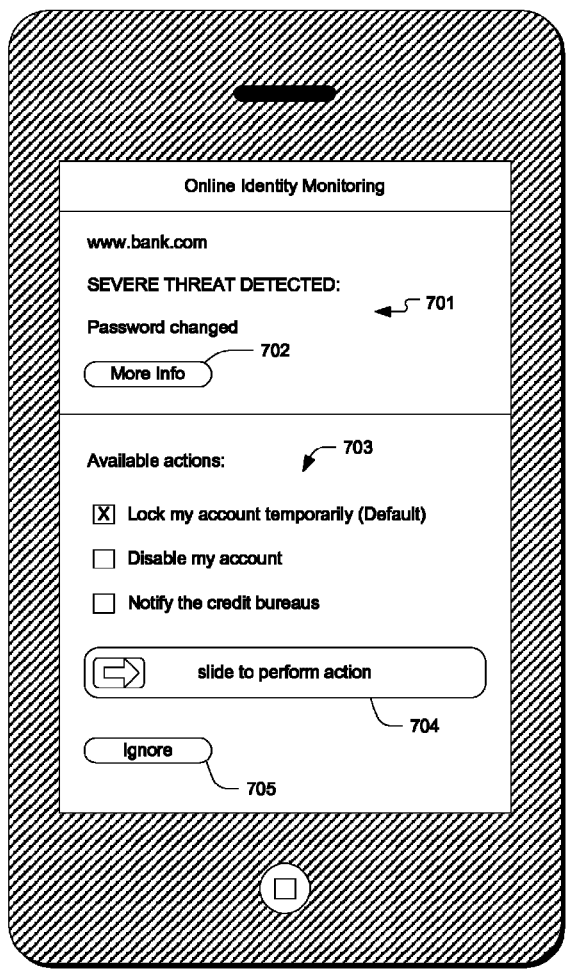
FIG. 7 is a sample notification message user interface that may be displayed on a mobile device as used in an embodiment.

FIG. 7 is a sample user interface with a notification message as displayed on a mobile device, as used in an embodiment. The information provided by the interface may be similar to that shown in the notification email of FIG. 6, and in various embodiments the mobile interface may include less or additional information, or information organized in a different form, as is suitable for the particular mobile device. In other embodiments, notifications may be transmitted to a mobile device via other delivery mechanisms, such as SMS messages, browser-renderable content, standalone applications, etc., which may also allow the user to select protective actions through any of these mechanisms.

The sample interface of FIG. 7 includes information about the detected event 701, as well as options for displaying further information 702. The sample interface further includes options for actions to be taken 703, an interface element to initiate the performance of the actions 704, and an interface element to ignore the event 705. Additional controls and/or information may be included on the mobile interface. In an embodiment, the mobile interface is displayed as a series of screens, in order to reduce the amount of information shown on each screen to accommodate for the smaller available display size on many mobile devices.

Example System Architecture

Figure 8:
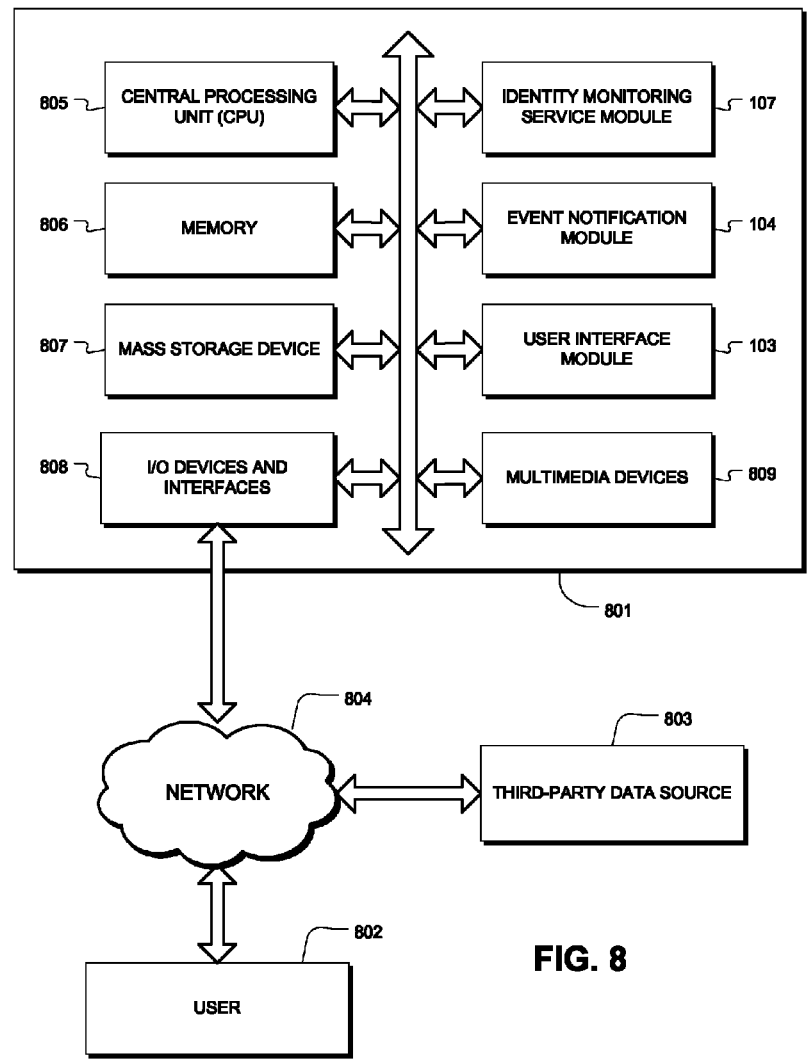
FIG. 8 is a block diagram of a computing system, as used in an embodiment.

FIG. 8 is a block diagram illustrating one embodiment of a computing system that implements the systems and methods described herein. In the embodiment of FIG. 8, a computing device 801 is in communication with a user 802, as well as an optional third-party data source 803, via a network 804. In an embodiment, the computing device 801 receives data, such as credit data, from one or more data sources 803 and accesses the data to identify information regarding one or more entities. The computing device 801 may then perform analysis and prepare information for presentation to the user 802. The management system 101 may include the same or similar components as the computing device 801. Similarly, the computing devices 801 may be used to implement any of the methods discussed herein.

The network 804 may include any communication network or combination of communication networks, such as one or more of the Internet, LANs, WANs, MANs, etc., for example. In the embodiment of FIG. 801, the computing device 801 includes a computing system having one or more computing devices (e.g., computers). The computing device 801 may include, for example, a single computing device, a computer server, a smart storage unit, or a combination of one or more computing devices and/or computer servers. Depending on the embodiment, the components illustrated in the computing device 801 may be distributed amongst multiple devices, such as via a local area or other network connection. In other embodiments the computing device 801 may include fewer and/or additional components that are illustrated in FIG. 8.

The exemplary computing device 801 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing device 801 may be controlled by a proprietary operating system. Conventional operating systems control and schedule computer processes for execution, perform memory management, provide file system, networking, I/O services, and provide a user interface, such as a graphical user interface ("GUI"), among other things.

The computing device 801 includes one or more central processing units ("CPU") 805, which may each include one or more conventional or proprietary microprocessor(s). The computing device 801 may further include one or more memories 806, such as random access memory ("RAM"), for temporary storage of information, read only memory ("ROM") for permanent storage of information, and/or a mass storage device 807, such as a hard drive, diskette, or optical media storage device. The memory 806 may store software code, or instructions, for execution by the processor 805 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the computing device 801. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The exemplary computing device 801 may include one or more input/output (I/O) devices and interfaces 808, such as a keyboard, trackball, mouse, drawing tablet, joystick, game controller, touchscreen (e.g., capacitive or resistive touchscreen), touchpad, accelerometer, and/or printer, for example. The computing device 801 may also include one or more multimedia devices 809, such as a display device (also referred to herein as a display screen), which may also be one of the I/O devices 808 in the case of a touchscreen, for example. Display devices may include LCD, OLED, or other thin screen display surfaces, a monitor, television, projector, or any other device that visually depicts user interfaces and data to viewers. The computing device 801 may also include one or more multimedia devices, such as speakers, video cards, graphics accelerators, and microphones, for example.

In the embodiment of FIG. 8, the I/O devices and interfaces 808 provides a communication interface to various external devices via the network 804. For example, the computing device 801 may be electronically coupled to the network 804 via a wired, wireless, or combination of wired and wireless, communication link(s). The network 804 may allow communication with various other computing devices and/or other electronic devices via wired or wireless communication links.

In the embodiment of FIG. 8, the computing device 801 may include an identity monitoring service module 107, an event notification module 104, and a user interface module 103, as well as other modules or fewer modules. The computing device 801 may include fewer or additional modules, such as the email monitoring module 108, the credentials monitoring module 109, and/or the direct notification module 110, which are discussed above with reference to FIG. 1. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C#, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 801, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Example Modules

In the embodiment of FIG. 8, the computing device 801 includes three modules, namely, an identity monitoring service module 107, an event notification module 104, and a user interface module 103, as well as other modules or fewer modules. In this embodiment, each of the modules is shown as part of the computing device 801. However, in other embodiments, the modules may be distributed across multiple devices, and may be controlled and/or operated by multiple different entities. These modules are configured to perform methods as described throughout this specification. In various embodiments, fewer or additional modules may be included within a computing system.

The computing device 801 may be configured to acquire user data and other external data such as third-party data. The various modules and/or other modules may comprise software alone, hardware alone, or a combination of software and hardware. The device may be especially adapted to communicate using a variety of network or communications protocols in order to communicate with external data sources such as data repositories, network servers, online services, telecommunication services, distributed computing systems, and so on. Some of these protocols may include standard network protocols, such as HTTP, FTP, SNMP, or the like. The device may further include hardware drivers, such as USB, FireWire, Thunderbolt (Light Peak), or serial communications drivers, for example to communicate with devices in direct communication with the system.

The computing device 801 may be configured to transmit, or initiate transmission of, data such as user interfaces, data reports, application programming interface data, or the like, to requesting entities, such as external user 802, that have registered interest with the system. In one embodiment, the device provides the data in an unformatted data structure, such as in an XML, CSV, TXT, or other spreadsheet, text, or web accessible data structure. In other embodiments, the device provides information in user interfaces, such as user interfaces that are configured for rendering by a web browser, mobile device, tablet device, or other device or application, for display to users. A variety of different presentations may be provided. In some embodiments, the requesting entities may indicate presentation preferences or configurations (e.g., data formats and/or types of information), and the device may transmit data based on the indicated preferences or configurations. The presentation format may also be determined based on the type of device being used by the user.

In an embodiment, any or all of the modules 103, 104, and 107-110 are configured to act in real time. Thus, when data is received by the modules, the modules process that data as soon as practicable or necessary to provide users with timely information. In order to achieve this, specialized hardware may be used to gain efficiency, and executable code may be designed to minimize latency or computation time. In an embodiment, the modules, possibly with other modules of the system, are executed within a real-time operating system, to enhance the responsiveness of the system.

SUMMARY

Depending on the embodiment, the methods described with reference to the flowcharts and block diagrams such as FIGS. 1-4 and 8, as well as any other methods discussed herein, may include fewer or additional blocks and/or the blocks may be performed in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the computing system 101 of FIG. 1 and/or other computing devices illustrated in the Figures, in order to perform the respective methods. For ease of explanation, the method will be described herein as performed by the various modules, such as may be executed on the computing system 101, which should be interpreted to include any one or more of the computing devices noted above and/or any other suitable computing device.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing devices described herein and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of monitoring and handling potential identity theft threats, the method being performed by a monitoring computer having one or more computer processors, the method comprising:
   receiving a request, by the monitoring computer, from a user to monitor a third party account of the user with an online service provider, the request including personal information associated with the user and a plurality of user preferences, each user preference specifying one or more protective actions to be taken in response to detection, by the monitoring computer, of a change or attempted change to personal information associated with the account;
   periodically monitoring the third party account of the user for indications of changes or attempted changes to personal information associated with the account;
   detecting a change or attempted change to personal information associated with the account;
   determining a risk level associated with the detected change or attempted change to personal information associated with the account;
   identifying, from the user preferences, a user preference associated with the determined risk level;
   transmitting, via a communication channel, a notification to the user, wherein the communication channel is specified by the user preference; and
   initiating one or more protective actions included in the identified user preference.

2. The method of claim 1, wherein periodically monitoring the third party account of the user for indications of changes to personal information comprises periodically connecting to the online service provider associated with the third party account of the user, providing the online service provider with login credentials associated with the user, and determining whether the online service provider accepts the provided login credentials.

3. The method of claim 1, wherein periodically monitoring the third party account of the user for indications of changes to personal information comprises periodically retrieving electronic messages associated with the user and analyzing content of the retrieved messages to determine whether any of the messages indicates a change to personal information.

4. The method of claim 1, wherein the risk level is determined at least in part based on whether a preauthorization for the change or attempted change to personal information was received.

5. The method of claim 1, wherein the one or more protective actions are initiated subsequent to receiving user approval for initiating the one or more protective actions.

6. The method of claim 1, wherein the one or more protective actions are initiated without requiring user approval for initiating the one or more protective actions.

7. A computing system configured to monitor and handle potential identity theft threats, comprising:
   a non-transitory computer-readable storage medium having stored thereon a plurality of executable software modules;
   one or more computer hardware processors configured to execute the plurality of software modules stored on the computer-readable storage medium;
   a network interface;
   a message monitoring module configured to access an electronic message received in an electronic mail account of a user and determine whether the electronic message indicates a change, a possible change, or an attempted change to personal information associated with an external account of the user;
   an event notification module configured to determine a risk level associated with the indicated change, possible change, or attempted change to personal information associated with the external account of the user and identify a user preference associated with the determined risk level in response to the message monitoring module determining that the electronic message indicates a change, a possible change, or an attempted change to personal information associated with the external account of the user, wherein the user preference specifies one or more user-customizable responsive actions to execute in response to determining that the electronic message indicates a change, a possible change, or an attempted change to personal information; and
   the event notification module further configured to execute at least one of the one or more user-customizable responsive actions based upon the user preference.

8. The computing system of claim 7, wherein the message monitoring module is configured to retrieve the electronic message by automatically logging into one or more email accounts and gathering messages from the one or more email accounts.

9. The computing system of claim 7, wherein the message monitoring module is configured to retrieve the electronic message by receiving messages sent to the computing system.

10. The computing system of claim 7, wherein at least one of the user-customizable responsive actions is sending an electronic notification identifying the change or possible change to personal information.

11. The computing system of claim 7, wherein the event notification module is configured to execute at least a portion of the user-customizable responsive actions only in response to receiving a user confirmation message.

12. The computing system of claim 7, wherein the event notification module is further configured to determine whether the change, the possible change, or the attempted change to personal information was preauthorized, and further configured to execute different user-customizable responsive actions if the possible change to personal information was preauthorized.

13. The computing system of claim 7, wherein the event notification module is configured to execute at least a portion of the user-customizable responsive actions without requiring user approval to execute the portion of the one or more user-customizable responsive actions.

14. Non-transitory physical computer storage comprising computer-executable instructions stored thereon that, when executed by a hardware processor, are configured to perform operations comprising:
- receiving a request from a user to monitor a third party account of the user with an online service provider, the request including personal information associated with the user and a plurality of user preferences, each user preference specifying one or more protective actions to be taken in response to detection of a change or attempted change to personal information associated with the account;
- periodically monitoring the third party account of the user for indications of changes or attempted changes to personal information associated with the account;
- detecting a change or attempted change to personal information associated with the account;
- determining a risk level associated with the detected change or attempted change to personal information associated with the account;
- identifying, from the user preferences, a user preference associated with the determined risk level;
- transmitting, via a communication channel, a notification to the user, wherein the communication channel is specified by the user preference; and
- initiating one or more protective actions included in the identified user preference.

15. The non-transitory physical computer storage of claim 14, wherein periodically monitoring the third party account of the user for indications of changes to personal information comprises periodically connecting to the online service provider associated with the third party account of the user, providing the online service provider with login credentials associated with the user, and determining whether the online service provider accepts the provided login credentials.

16. The non-transitory physical computer storage of claim 14, wherein periodically monitoring the third party account of the user for indications of changes to personal information comprises periodically retrieving electronic messages associated with the user and analyzing content of the retrieved messages to determine whether any of the messages indicates a change to personal information.

17. The non-transitory physical computer storage of claim 16, wherein the electronic messages are retrieved by automatically logging into one or more email accounts and gathering messages from the one or more email accounts.

18. The non-transitory physical computer storage of claim 14, wherein the risk level is determined at least in part based on whether a preauthorization for the change or attempted change to personal information was received.

19. The non-transitory physical computer storage of claim 14, wherein the one or more protective actions are initiated subsequent to receiving user approval for initiating the one or more protective actions.

20. The non-transitory physical computer storage of claim 14, wherein the one or more protective actions are initiated without requiring user approval for initiating the one or more protective actions.

* * * * *